(12) United States Patent
Stone (10) Patent No.: US 9,609,734 B2
(45) Date of Patent: Mar. 28, 2017

(54) PLASMA TORCH AND SYSTEM WITH ELECTROMAGNETIC SHIELD ASSIST MECHANISM

(71) Applicant: LINCOLN GLOBAL, INC., City of Industry, CA (US)

(72) Inventor: Jeremy Stone, Summerville, SC (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 0 days.

(21) Appl. No.: 14/670,386

(22) Filed: Mar. 26, 2015

(65) Prior Publication Data

US 2015/0289354 A1  Oct. 8, 2015

Related U.S. Application Data

(60) Provisional application No. 61/974,281, filed on Apr. 2, 2014.

(51) Int. Cl.
*B23K 10/00* (2006.01)
*H05H 1/40* (2006.01)
*B23K 9/073* (2006.01)
*H05H 1/34* (2006.01)

(52) U.S. Cl.
CPC ............ *H05H 1/40* (2013.01); *B23K 9/073* (2013.01); *H05H 1/34* (2013.01); *H05H 2001/3457* (2013.01); *H05H 2001/3494* (2013.01)

(58) Field of Classification Search
CPC .... H05H 1/40; H05H 2001/3457; H05H 1/34; H05H 2001/3494; B23K 9/073

USPC ............ 219/121.5, 121.48, 121.54, 121.57, 219/121.39
See application file for complete search history.

(56) References Cited

U.S. PATENT DOCUMENTS

| | | | |
|---|---|---|---|
| 2,945,119 A * | 7/1960 | Blackman | H05H 1/40 219/121.5 |
| 3,102,946 A * | 9/1963 | Fonberg | H05H 1/40 219/123 |
| 4,194,106 A | 3/1980 | Rudaz et al. | |

(Continued)

FOREIGN PATENT DOCUMENTS

| | | |
|---|---|---|
| GB | 971063 A | 9/1964 |
| JP | 04131694 A | 5/1992 |
| WO | 2013177387 A1 | 11/2013 |

OTHER PUBLICATIONS

International Search Report and Opinion for PCT/IB2015/000424; Jul. 10, 2015; 15 pages.

(Continued)

*Primary Examiner* — Mark Paschall
(74) *Attorney, Agent, or Firm* — Perkins Coie LLP (57) ABSTRACT

A plasma arc system includes a plasma torch having a torch nozzle with an opening at a distal end for a plasma jet to exit. An electromagnetic shield cap is disposed near the distal end of the torch nozzle with the shield cap having an opening that is coaxial with the opening of the torch nozzle. A plasma cutting power source supplies current to the torch to create the plasma jet. A magnetic field power source provides a current to the electromagnetic shield cap to generate a magnetic field near the plasma jet to focus the plasma jet as the plasma jet exits the torch nozzle. A controller synchronizes operation of the power sources during a transition from a piercing operation to a cutting operation.

28 Claims, 5 Drawing Sheets

(56) References Cited

U.S. PATENT DOCUMENTS

| | | | | |
|---|---|---|---|---|
| 4,275,287 A * | 6/1981 | Hiratake | ................ | H05B 7/185 |
| | | | | 219/121.37 |
| 5,043,554 A * | 8/1991 | Kohsaka | .............. | B23K 10/006 |
| | | | | 219/121.39 |
| 5,298,714 A * | 3/1994 | Szente | ................ | B23K 10/006 |
| | | | | 118/308 |
| 5,360,495 A * | 11/1994 | Schuler | ................... | C21D 1/09 |
| | | | | 148/565 |

OTHER PUBLICATIONS

International Application No. PCT/IB2015/000424, International Search Report and Written Opinion, 11 pages, Oct. 13, 2016.

\* cited by examiner

PLASMA TORCH AND SYSTEM WITH ELECTROMAGNETIC SHIELD ASSIST MECHANISM

PRIORITY

The present application claims priority to U.S. Provisional Patent Application No. 61/974,281, which is incorporated herein by reference in its entirety.

TECHNICAL FIELD

Devices, systems, and methods consistent with the invention relate to cutting, and more specifically to devices, systems and methods for using an electromagnetic shield assist mechanism with a plasma arc torch.

BACKGROUND

In many cutting an spraying and welding operations, plasma arc torches are utilized. With these torches a plasma gas jet is emitted into the ambient atmosphere at a high temperature. The jets are emitted from a nozzle and pass through a shield to the workpiece. Typically a shielding gas is used to aid in maintaining the shape and/or stability of the plasma jet. In fact, large amounts of shielding gas is used in cutting operations during the transition from piercing a workpiece to cutting the workpiece. The shielding gas is increased during the transition to keep the plasma jet stable. However, this can consume large amounts of shielding gas and at times the responsiveness and control of the gas is not optimal, which can result in a poor transition from the piercing of a workpiece to the cutting of the workpiece.

Further limitations and disadvantages of conventional, traditional, and proposed approaches will become apparent to one of skill in the art, through comparison of such approaches with embodiments of the present invention as set forth in the remainder of the present application with reference to the drawings.

BRIEF SUMMARY OF THE INVENTION

An exemplary embodiment of the present invention is a plasma torch nozzle and torch utilizing the nozzle, where the nozzle has a configuration which stabilizes and optimizes the plasma arc for improved performance.

In an exemplary embodiment, a plasma arc system includes a plasma torch having a torch nozzle with an opening at a distal end for a plasma jet to exit. An electromagnetic shield cap is disposed near the distal end of the torch nozzle with the electromagnetic shield cap having an opening that is coaxial with the opening of the torch nozzle. A plasma cutting power source supplies current to the torch to create the plasma jet. A magnetic field power source provides a current to the electromagnetic shield cap to generate a magnetic field near the plasma jet to focus the plasma jet as the plasma jet exits the torch nozzle. A controller synchronizes operation of the power sources during a transition from a piercing operation to a cutting operation.

In another exemplary embodiment, a plasma torch assembly includes an electrode assembly to receive current from a plasma cutting power source to create a plasma jet. The assembly includes a torch nozzle with an opening at a distal end for the plasma jet to exit the torch nozzle. The assembly also includes an electromagnetic shield cap disposed near the distal end of the torch nozzle. The electromagnetic shield cap has an opening that is coaxial with the opening of the torch nozzle. The electromagnetic shield cap is designed to receive a current from a magnetic field power source and designed such that a magnetic field is generated near the plasma jet as the plasma jet exits the torch nozzle.

Another exemplary embodiment is directed to a method of controlling a plasma arc system. The method includes providing a plasma gas to a plasma torch and creating a plasma jet in the plasma torch such that the plasma jet exits the plasma torch through an opening in a torch nozzle of the plasma torch. The method further includes generating a magnetic field in an electromagnetic shield cap disposed near the distal end of the torch nozzle. The electromagnetic shield cap has an opening that is coaxial with the opening of the torch nozzle. The method also includes synchronizing plasma jet operation and magnetic field operation during a transition from a piercing operation to a cutting operation. The magnetic field is generated near the plasma jet to focus the plasma jet as the plasma jet exits the torch nozzle.

The summary of the invention is provided as a general introduction to some embodiments of the invention, and is not intended to be limiting to any particular configuration or system. It is to be understood that various features and configurations of features described in the Summary can be combined in any suitable way to form any number of embodiments of the invention. Some additional example embodiments including variations and alternative configurations are provided herein.

BRIEF DESCRIPTION OF THE DRAWINGS

The above and/or other aspects of the invention will be more apparent by describing in detail exemplary embodiments of the invention with reference to the accompanying drawings, in which.

DETAILED DESCRIPTION

Reference will now be made in detail to various and alternative exemplary embodiments and to the accompanying drawings, with like numerals representing substantially identical structural elements. Each example is provided by way of explanation, and not as a limitation. In fact, it will be apparent to those skilled in the art that modifications and variations can be made without departing from the scope or spirit of the disclosure and claims. For instance, features illustrated or described as part of one embodiment may be used on another embodiment to yield a still further embodiment. Thus, it is intended that the present disclosure includes modifications and variations as come within the scope of the appended claims and their equivalents.

The present disclosure is generally directed to a configuration for a plasma arc torch and system useful for various cutting operations. It should be noted that for purposes of brevity of clarity, the following discussion will be directed to exemplary embodiments of the present invention which are primarily directed to a plasma torch for cutting. However, embodiments of the present invention are not limited in this regard and embodiments of the present invention can be used in welding and spraying torches without departing from the spirit or scope of the present invention. The application of the present invention can include use in either mechanized torch assemblies or a hand-held torch assemblies. Various types and sizes of torches are possible at varying voltages if desired. Further, the torches using the disclosed nozzles could be used for marking, cutting or metal removal. Additionally, exemplary embodiments of the present invention, can be used with varying currents and varying power levels. Of course, it should also be noted that embodiments of the present invention can be used in torches which are cooled with a torch coolant. The construction and utilization of such coolant systems are known and need not be discussed in detail herein.

Figure 1:
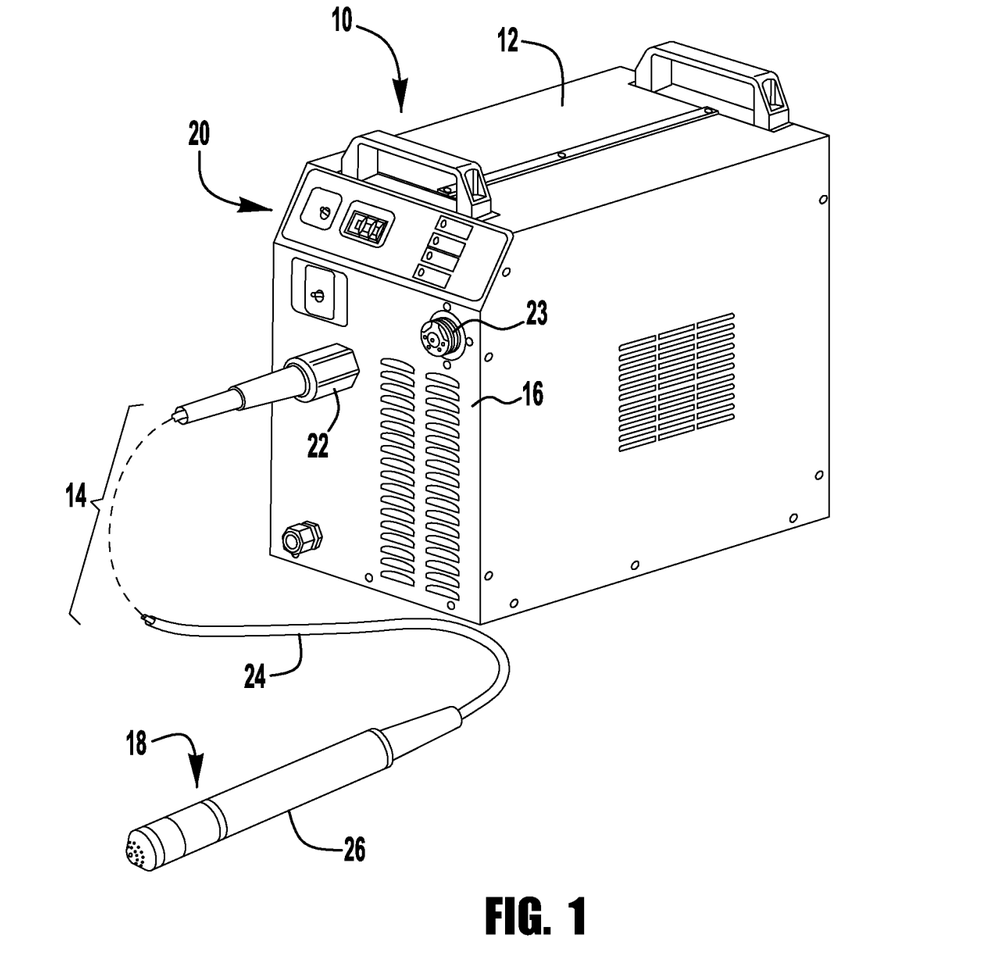
FIG. 1 is a perspective view of one example of a plasma arc torch system according to certain aspects of the disclosure.

FIG. 1 shows one example of such a plasma arc torch device 10. As shown, device 10 includes a housing 12 with a connected torch assembly 14. Housing 12 includes the various conventional components for controlling a plasma arc torch, such as a power supply, a plasma starting circuit, air regulators, fuses, transistors, input and output electrical and gas connectors, controllers and circuit boards, etc. Torch assembly 14 is attached to a front side 16 of housing. Torch assembly 14 includes within it electrical connectors to connect an electrode and a nozzle within the torch end 18 to electrical connectors within housing 12. Separate electrical pathways may be provided for a pilot arc and a working arc, with switching elements provided within housing 12. A gas conduit is also present within torch assembly to transfer the gas that becomes the plasma arc to the torch tip, as will be discussed later. Various user input devices 20 such as buttons, switches and/or dials may be provided on housing 12, along with various electrical and gas connectors.

It should be understood that the housing 12 illustrated in FIG. 1 is but a single example of a plasma arc torch device that could employ aspects of the inventive the concepts disclosed herein. Accordingly, the general disclosure and description above should not be considered limiting in any way as to the types or sizes of plasma arc torch devices that could employ the disclosed torch elements.

As shown in FIG. 1, torch assembly 14 includes a connector 22 at one end for attaching to a mating connector 23 of housing 12. When connected in such way, the various electrical and gas passageways through the hose portion 24 of torch assembly 14 are connected so as to place the relevant portions of torch body 26 in connection with the relevant portions within housing 12.

Figure 2:
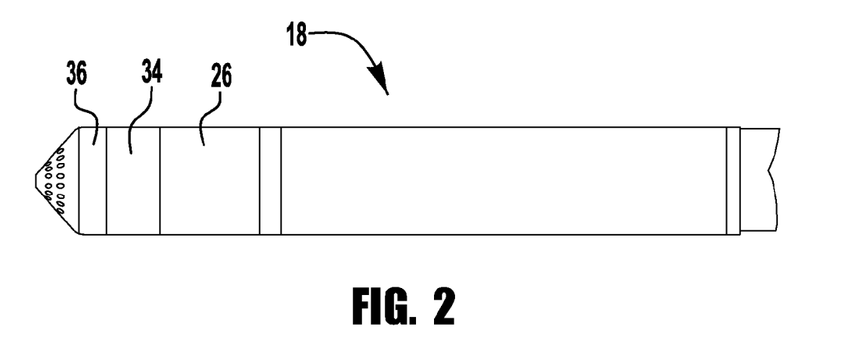
FIG. 2 is a perspective view of the torch portion of the system of FIG. 1.
Figure 3:
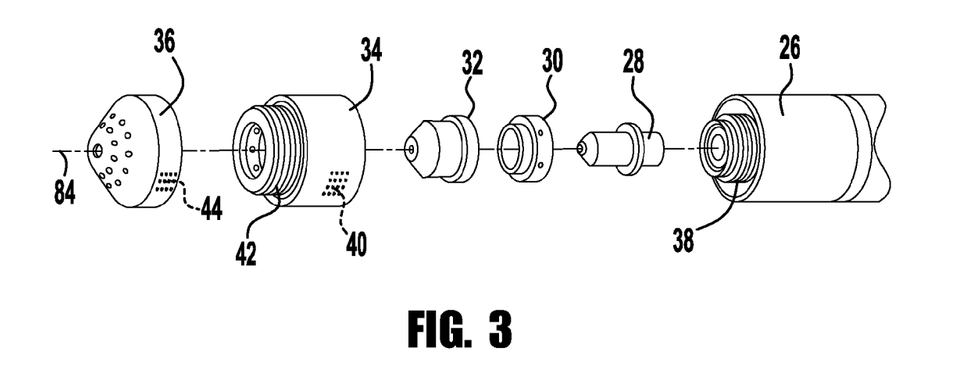
FIG. 3 is an exploded perspective view of the end of the torch portion of FIG. 2.

FIG. 3 shows an exploded view of the end of torch body 26. As shown therein, attached to torch body 26 are electrode 28, swirl ring 30, nozzle 32, retaining cap 34, and shield cap 36. First mating threads 38 and 40 on torch body 26 and retaining cap 34, and second mating threads 42 and 44 on retaining cap 34 and shield cap 36 may be used to hold these pieces together on the end of torch body 26 in the configuration shown in FIG. 2. The sizes, dimensions and arrangements of these elements may be varied somewhat depending on the desired amperage, flow, work to be performed, etc. as is conventional, and additional parts may be employed in some arrangements depending on the application.

It should be noted that the embodiment of the plasma torch system shown in FIGS. 1-3 is intended to be exemplary of the systems that can be used with embodiments of the present invention, and is not intended to be limiting.

As explained previously, in many plasma cutting operations a pierce operation is needed where the plasma jet must pierce or burn through the workpiece prior to a cut beginning. As is generally understood, the plasma jet for a pierce has different characteristics then that used for cutting. As such, prior to the cutting operation beginning the plasma jet must transition from its pierce characteristics to its cutting characteristics. In many applications, this transition requires the use of a large amount shielding gas to be used to keep the plasma jet at a desired stability. Further, in some instances the shielding gas is unable to maintain the desired stability, which can cause a defect in the workpiece. Embodiments of the present invention address these issues with known systems as explained below.

Figure 4:
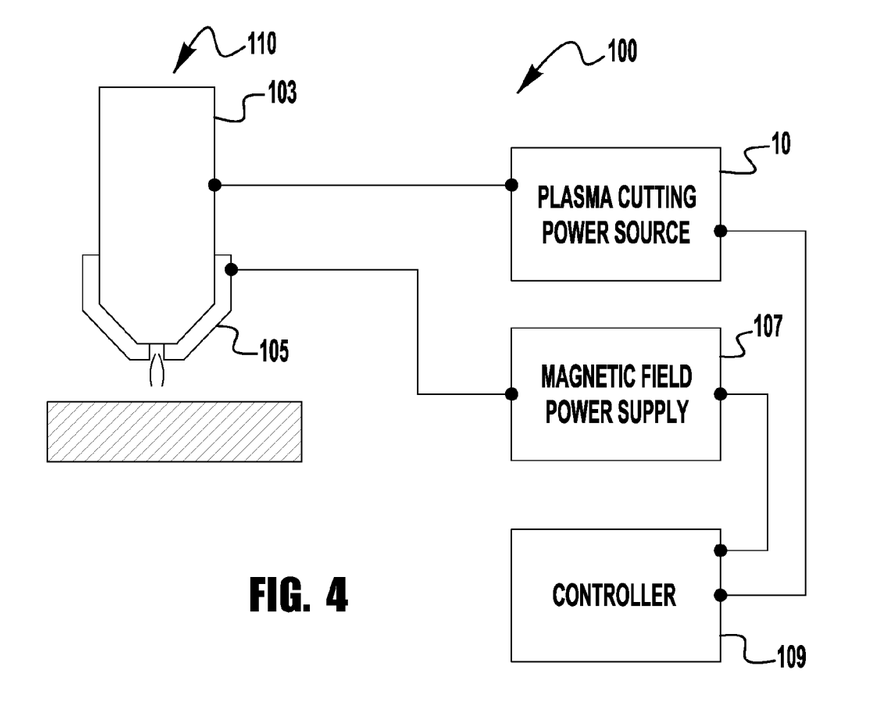
FIG. 4 is a diagrammatical representation of an exemplary system in accordance with an embodiment of the present invention.

FIG. 4 depicts an exemplary system in accordance with an embodiment of the present invention. The system 100 includes a power supply 10 (similar to that described in FIG. 1) which provides the cutting current to a torch assembly 110 which contains a torch 103 and an electromagnetic shield cap 105. The torch 103 can have a similar construction to that described above, or can be configured consistent with any known torch configuration. The shield cap 105 is secured to the torch 103 such that the cap 105 is coaxial with the torch 103 and covers at least a portion of the shield of the torch 103. For example, the shield cap 105 can be secured to the torch 103 with threads, or other mechanical means. Further, the shield cap 105 has an opening which coincides with the plasma jet opening of the torch 103. As shown, the shield cap 105 is coupled to a magnetic field power supply 107. The magnetic field power supply provides an electrical current to the cap 105 so that the cap 105 generates a magnetic field near the plasma jet during operation. The generated magnetic field aids in holding the jet stable, without the need for increasing the flow rate or volume of a shielding gas. This will be discussed further below.

The magnetic field power supply 107 is constructed consistent with known power supplies capable of generating an electrical signal that can create a magnetic field in the cap 105. In some exemplary embodiments, the power supply 107 is capable of outputting a signal in either a positive or negative polarity, and at a varying current level so as to allow the generated magnetic field to be controlled as desired. It should be noted that while FIG. 4 shows the power supply 107 to be a separate component from the cutting power supply 10, in other exemplary embodiments the power supply 107 is incorporated into the main power supply 10 so that a single power supply unit is provided, where the magnetic field power module is internal to the power supply 10 housing. Further shown in FIG. 4 is a controller 109 which controls the operation of the magnetic field power supply 107. That is, the controller 109 communicates with each of the power supplies 10/107 so as to ensure that the power supply 107 provides the appropriate current to the shield cap 105 as needed to achieve the desired performance. That is, the controller 109 synchronizes the two power supplies such that a magnetic field is generated by the shield cap 105 during transition from piercing the workpiece to cutting the workpiece.

Figure 5:
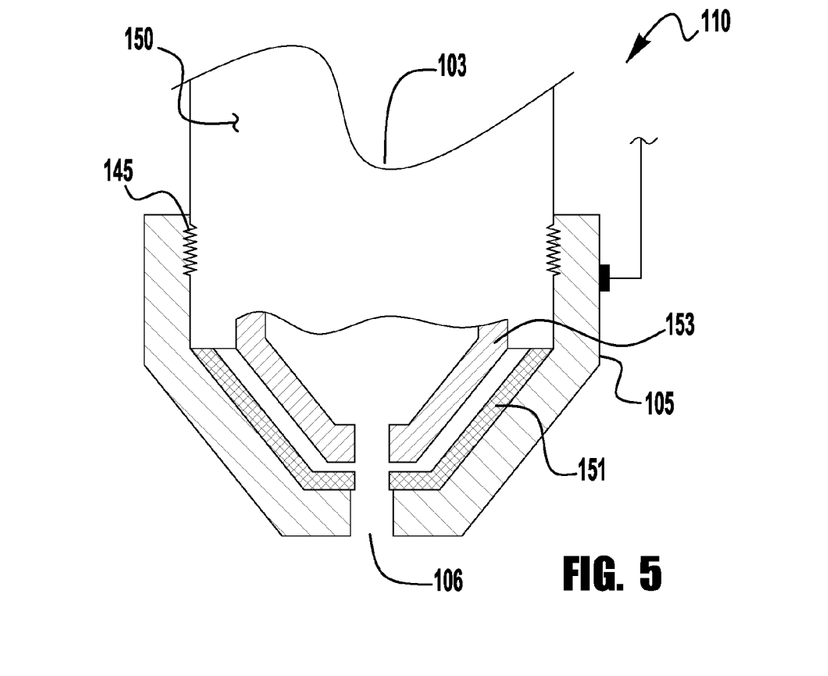
FIG. 5 is a diagrammatical representation of a portion of a torch in accordance with an exemplary embodiment of the present invention.

FIG. 5 depicts a cross-section of an exemplary torch assembly 110 of the present invention. As shown, the shield cap 105 is placed over the shield 151, where the shield 151 can be configured like any known shield configuration. Further, the shield cap 105 can use threads 145 to couple the shield cap 105 to the outer retaining cap 150. The shield cap 105 includes electromagnetic material, e.g., magnets, within the shield cap 105. In some embodiments, the electromagnetic material is in the shape of a toroid (or multiple toroids) that surrounds the torch nozzle 153 to focus the plasma jet as the plasma jet exits the torch nozzle 153. Of course, other shapes are possible so long as it produces the desired focusing effect on the plasma jet. In some embodiments, the electromagnetic material is one solid piece. In other exemplary embodiments, the electromagnetic material can be segmented and arranged as desired within the shield cap 105 as desired. For example, multiple magnets can be arranged equidistant to each other within the shield cap 105, e.g. axially, circumferentially, or both. Of course, this arrangement is not limiting and other arrangements are possible. The electromagnetic material within the shied cap 105 can be of the same type or can vary within the cap to produce the desired focusing effect on the plasma torch. For example, if multiple magnets are used, the magnets can be made of the same material or be made of different materials, e.g., to vary the shape of the magnetic field as desired. Similarly, the shape and/or dimensions of the electromagnetic material segments, e.g., magnets, can be the same or be varied to produce the desired shape of the magnetic field. Of course, any combination of number of segments, material type, shape, and dimensions of the electromagnetic material in the shield cap 105 can be varied to produce the desired focusing effect on the plasma jet. During operation, the plasma jet passes through an opening in the nozzle 153 and then an opening in the shield 151—consistent with typical torch operation. The jet then passes through the opening 106 in the shield cap 105 which is coaxial with the openings in the shield 151 and nozzle 153. During operation, the magnetic field generated by the shield cap 105 is generated at the opening 106. This is depicted in FIG. 6.

Figure 6:
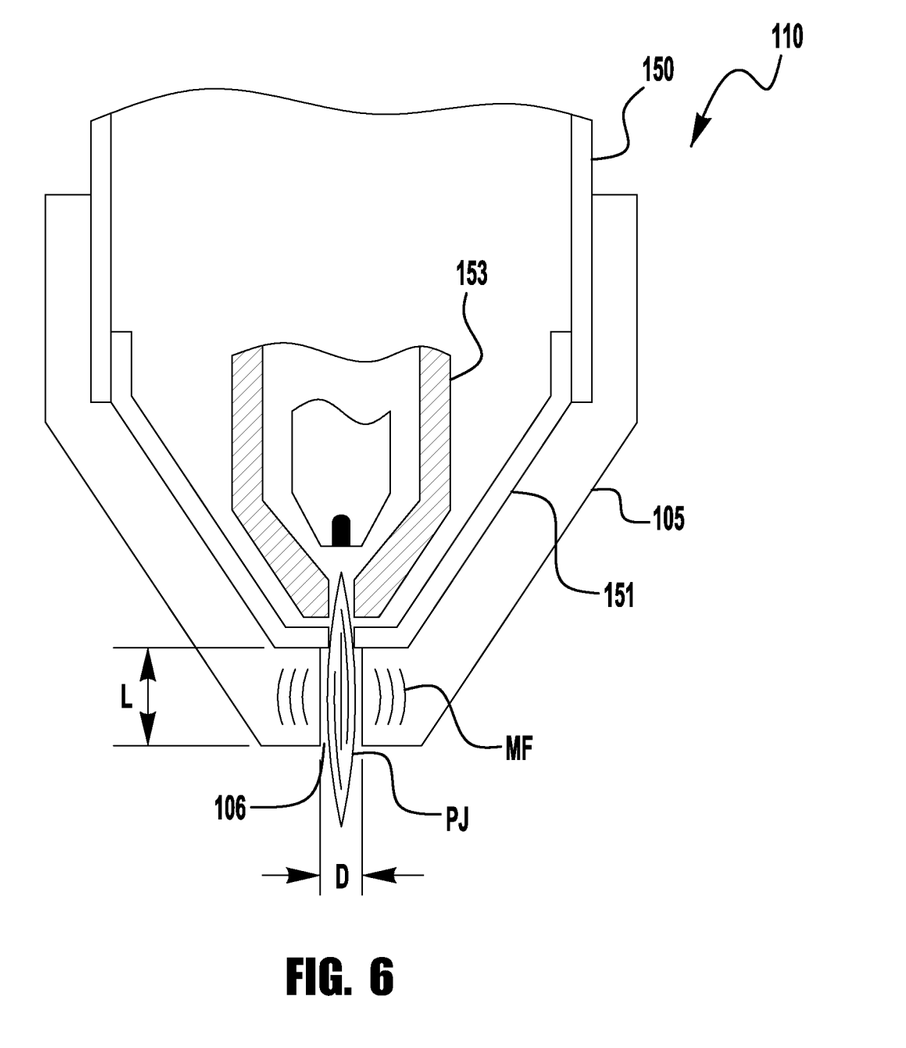
FIG. 6 is a diagrammatical representation of the torch of FIG. 5 being employed in a cutting operation.

As shown in FIG. 6, the plasma jet PJ passes through the opening 106 and is held stable by the magnetic field MF generated by the shield cap 105. The magnetic field MF generates a pinch or squeezing force that aids in keeping the plasma jet PJ focused—without the need for increasing or changing the flow rate of the shield gas. In exemplary embodiments, the shield cap 105 is constructed such that the opening has a length L is the range of 0.03 to 0.5 in. The length L should be such that it does not adversely compromise the cutting effectiveness of the plasma jet PJ. Further, the opening 106 can have a diameter D in the range of 0.0625 to 0.75 in. In exemplary embodiments of the present invention, the diameter D of the opening 106 is larger than the plasma jet opening in the shield 151. In exemplary embodiments, the diameter D of the opening 106 is in the range of 5 to 70% larger than the diameter of the opening in the shield 151. In further exemplary embodiments, the range is 10 to 40% larger.

In some exemplary embodiments, the shield cap 105 can have vents, slots and/or other types of openings which correspond with any openings/vents on the shield 151 to the extent that the shield 151 has such openings. Further, in exemplary embodiments, there is no isolator between the shield cap 105 and the shield 151. Further, in exemplary embodiments the inner surface of the shield cap 105 is in direct contact with the outer surface of the shield 151 at the openings. Further, in exemplary embodiments, the shield 151 and shield cap 105 are in direct contact over all, or the majority, of the area of which these components overlap. For example, as shown in FIG. 6, absent interference from the retaining cap 150, the shield 151 and shield cap 105 are in direct contact over the majority of the adjacent area downstream of the end of the retaining cap 150.

Figure 7:
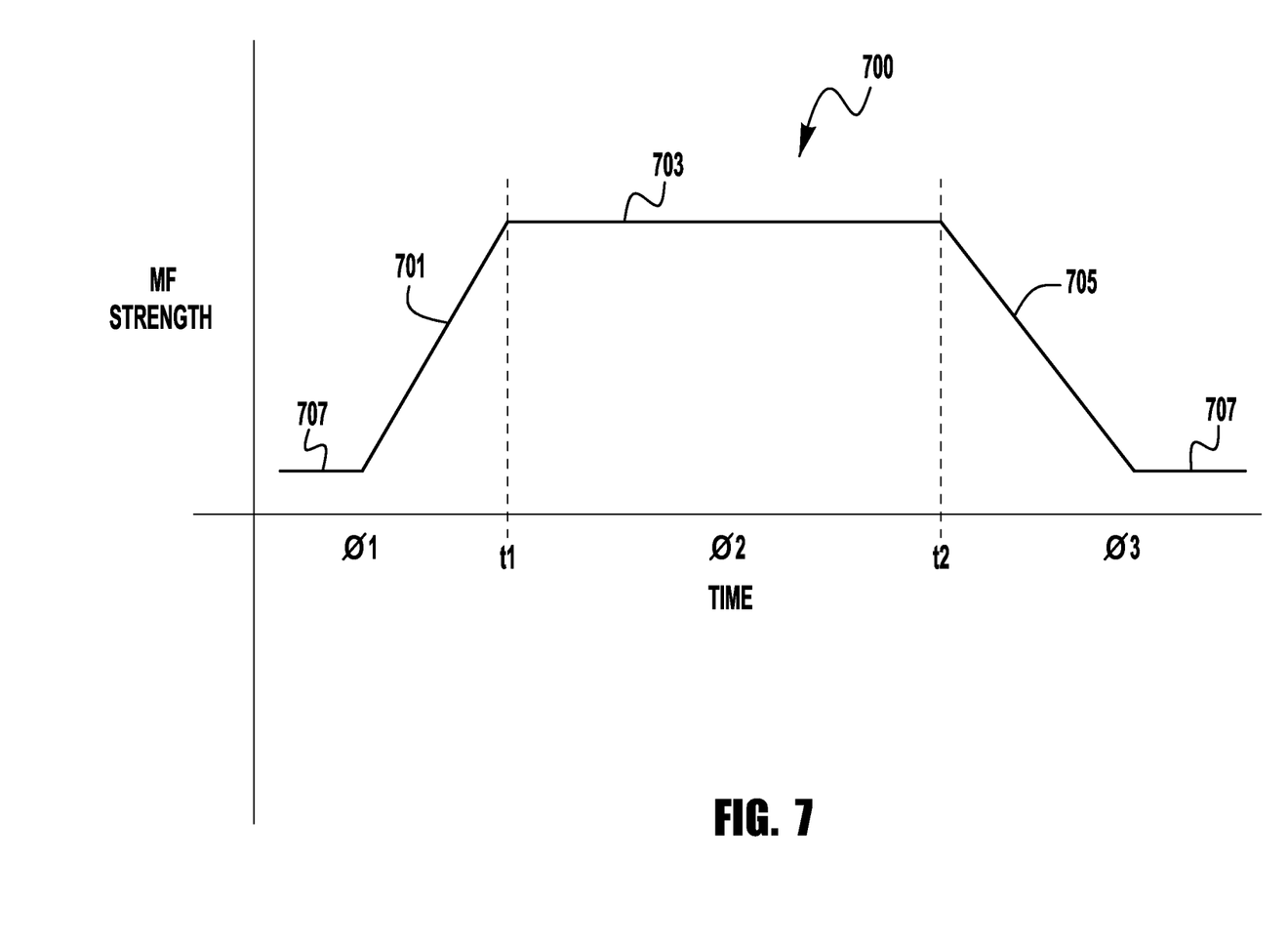
FIG. 7 is a diagrammatical representation of magnetic field strength during a transition in accordance with an exemplary embodiment of the present invention.

Turning now to FIG. 7, an exemplary diagram depicting the strength of the magnetic field MF during a transition is depicted. The depicted waveform 700 is exemplary and embodiments of the present invention are not limited to the exact waveform shown. For example, while FIG. 7 shows the magnetic field ramp rates to be constant, embodiments of the present invention can use variable ramp rates. As shown, prior to transition and during pierce (phase φ1) the magnetic field MF can be at zero or a low background level 707 and then ramps up to a peak level 703 when the transition begins at t1. Thus, in some embodiments, the transition between pierce and cut begins at the same time the magnetic field MF reaches its peak strength 703. In other exemplary embodiments the magnetic field MF can reach its peak level 703 slightly before the transition period beginning at t1. As shown in this embodiment the magnetic field MF is increased with a linear slope 701. Further, during the first phase φ1 the shield gas is maintained at its standard pressure level that would normally be used for piercing operations—a first pressure level. When the pierce to cut transition begins (at t1) the magnetic field MF is maintained at a constant strength level 703 during the duration of the transition (phase φ2). During this time a typical transition can be implemented. However, unlike with respect to known systems the shield gas pressure can be maintained at the same level as φ1, or in other exemplary embodiments the shield gas pressure can be reduced to a second level—which is lower than shield gas pressure used during φ1. Both the shield gas pressure and magnetic field strength are maintained constant during the transition stage φ2. When the transition ends—at t2—the magnetic field MF strength is reduced (via ramp rate 705) to either a background level 707, or in some embodiments to zero. During this ramp down phase φ3 the shield gas pressure level can be returned to its normal level (for example, the same level as during φ1) or can be adjusted to the desired cutting pressure level. It is noted that in some exemplary embodiments, the peak level 703 for the magnetic field MF can be maintained for a short duration after the end of the transition at t2, but this extension should not be too long so as to disturb the cutting plasma jet. Of course, other profiles 700 can be used without departing from the spirit or scope of the present invention.

As explained previously, the above-described techniques can be implemented in the controller 109, or any other computer controlled system, using digital electronic circuitry, or in computer hardware, firmware, software, or in combinations of them. The implementation can be as a computer program product, i.e., a computer program tangibly embodied in an information carrier (e.g., a CPS). An information carrier can be a machine-readable storage device or in a propagated signal, for execution by, or to control the operation of, data processing apparatus (e.g., a programmable processor, a computer, or multiple computers).

A computer program (e.g., a computer program system) can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the invention by operating on input data and generating output. Method steps can also be performed by, and apparatus can be implemented as, special purpose logic circuitry, e.g., an FPGA (field programmable gate array) or an ASIC (application specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, (e.g., magnetic, magneto-optical disks, or optical disks). Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the above described techniques can be implemented on a CNC or computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). This implementation can be found in the user interface 20 as shown in FIG. 1. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

Comprise, include, and/or plural forms of each are open ended and include the listed parts and can include additional parts that are not listed. And/or is open ended and includes one or more of the listed parts and combinations of the listed parts.

While the subject matter of the present application has been described with reference to certain embodiments, it will be understood by those skilled in the art that various changes may be made and equivalents may be substituted without departing from the scope of the subject matter. In addition, many modifications may be made to adapt a particular situation or material to the teachings of the subject matter without departing from its scope. Therefore, it is intended that the subject matter not be limited to the particular embodiment disclosed, but that the subject matter will include all embodiments falling within the scope described herein.

What is claimed is:

1. A plasma arc system, the system comprising:
   a plasma torch, the plasma torch having a torch nozzle with an opening at a distal end for a plasma jet to exit the plasma torch;
   an electromagnetic shield cap disposed near the distal end of the torch nozzle, the electromagnetic shield cap having an opening that is coaxial with the opening of the torch nozzle; a plasma cutting power source to supply current to the torch to create the plasma jet;
   a magnetic field power source to provide a current to the electromagnetic shield cap to generate a magnetic field near the plasma jet to focus the plasma jet as the plasma jet exits the torch nozzle; and
   a controller to synchronize operation of the plasma cutting power source and operation of the magnetic field power source during a transition from a piercing operation that burns through a workpiece to a cutting operation that cuts the workpiece,
   wherein the magnetic field ramps from a background level value to a peak level value prior to the transition from the piercing operation to the cutting operation and the magnetic field reaches the peak level value at a same time as the transition from the piercing operation to the cutting operation.

2. The plasma arc system of claim 1, wherein the magnetic field is generated at the opening in the electromagnetic shield cap as the plasma jet passes through the opening in the electromagnetic shield cap.

3. The plasma arc system of claim 2, wherein the magnetic field generates a pinch or squeezing force on the plasma jet that aids in keeping the plasma jet focused.

4. The plasma arc system of claim 1, wherein the magnetic field ramp from the background level value to the peak level value is linear.

5. The plasma arc system of claim 1, wherein a flow of the shield gas to the torch is maintained at a constant flow rate during the transition from the piercing operation to the cutting operation in the plasma arc system.

6. The plasma arc system of claim 1, wherein a flow of the shield gas to the torch is reduced during the transition from the piercing operation to the cutting operation in the plasma arc system.

7. The plasma arc system of claim 1, wherein the opening in the electromagnetic shield cap has a length in a range of 0.03 in to 0.5 in.

8. The plasma arc system of claim 1, wherein the opening in the electromagnetic shield cap has a diameter in a range of 0.0625 in to 0.75 in.

9. The plasma arc system of claim 1, further comprising:
   a torch shield disposed between the distal end of the torch nozzle and the electromagnetic shield cap, the torch shield having an opening that is coaxial with the openings of the torch nozzle and the electromagnetic shield cap.

10. The plasma arc system of claim 9, wherein the opening in the electromagnetic shield cap has a diameter that is larger than a diameter of the opening of the torch shield.

11. The plasma arc system of claim 10, wherein the opening in the electromagnetic shield cap has a diameter that is in a range of 5 percent to 70 percent larger than a diameter of the opening in the torch shield.

12. The plasma arc system of claim 10, wherein the opening in the electromagnetic shield cap has a diameter that is in a range of 10 percent to 40 percent larger than a diameter of the opening in the torch shield.

13. The plasma arc system of claim 10, wherein the torch shield has one of vents and slots and the electromagnetic shield cap has corresponding one of vents and slots that align with the one of vents and slots of the torch shield.

14. The plasma arc system of claim 10, wherein a gap exists between a majority area of an outer surface of the torch shield and a majority area of an inner surface of the electromagnetic shield cap.

15. The plasma arc system of claim 10, wherein a majority area of an outer surface of the torch shield and a majority area of an inner surface of the electromagnetic shield cap are in direct contact.

16. The plasma arc system of claim 1, wherein the magnetic field ramps down from the peak level value to the background level value after the transition ends.

17. A plasma torch assembly, the assembly comprising:
an electrode assembly to receive current from a plasma cutting power source to create a plasma jet;
a torch nozzle with an opening at a distal end for the plasma jet to exit the torch nozzle;
an electromagnetic shield cap disposed near the distal end of the torch nozzle, the electromagnetic shield cap having an opening that is coaxial with the opening of the torch nozzle, the electromagnetic shield cap to receive a current from a magnetic field power source such that a magnetic field is generated near the plasma jet to focus the plasma jet as the plasma jet exits the torch nozzle; and
a torch shield disposed between the distal end of the torch nozzle and the electromagnetic shield cap, the torch shield having an opening that is coaxial with the openings of the torch nozzle and the electromagnetic shield cap.

18. The plasma torch assembly of claim 17, wherein the magnetic field is generated at the opening in the electromagnetic shield cap as the plasma jet passes through the opening in the electromagnetic shield cap.

19. The plasma torch assembly of claim 18, wherein the magnetic field generates a pinch or squeezing force on the plasma jet that aids in keeping the plasma jet focused.

20. The plasma torch assembly of claim 17, wherein the opening in the electromagnetic shield cap has a length in a range of 0.03 in to 0.5 in.

21. The plasma torch assembly of claim 17, wherein the opening in the electromagnetic shield cap has a diameter in a range of 0.0625 in to 0.75 in.

22. The plasma torch assembly of claim 17, wherein the opening in the electromagnetic shield cap has a diameter that is larger than a diameter of the opening of the torch shield.

23. The plasma torch assembly of 17, wherein the opening in the electromagnetic shield cap has a diameter that is in a range of 5 percent to 70 percent larger than a diameter of the opening in the torch shield.

24. The plasma torch assembly of claim 17, wherein the opening in the electromagnetic shield cap has a diameter that is in a range of 10 percent to 40 percent larger than a diameter of the opening in the torch shield.

25. The plasma torch assembly of claim 17, wherein the torch shield has one of vents and slots and the electromagnetic shield cap has corresponding one of vents and slots that align with the one of vents and slots of the torch shield.

26. The plasma torch assembly of claim 17, wherein a gap exists between a majority area of an outer surface of the torch shield and a majority area of an inner surface of the electromagnetic shield cap.

27. The plasma torch assembly of claim 17, wherein a majority area of an outer surface of the torch shield and a majority area of an inner surface of the electromagnetic shield cap are in direct contact.

28. A method of controlling a plasma arc system, the method comprising:
providing a plasma gas to a plasma torch;
creating a plasma jet in the plasma torch such that the plasma jet exits the plasma torch through an opening in a torch nozzle of the plasma torch;
generating a magnetic field in an electromagnetic shield cap disposed near the distal end of the torch nozzle, the electromagnetic shield cap having an opening that is coaxial with the opening of the torch nozzle; and
synchronizing plasma jet operation and magnetic field operation during a transition from a piercing operation that burns through a workpiece to a cutting operation that cuts the workpiece,
wherein the magnetic field is generated near the plasma jet to focus the plasma jet as the plasma jet exits the torch nozzle,
wherein the magnetic field ramps from a background level value to a peak level value prior to the transition from the piercing operation to the cutting operation and the magnetic field reaches the peak level value at a same time as the transition from the piercing operation to the cutting operation.

* * * * *